United States Patent [19]
Czarnocki et al.

[11] Patent Number: 5,744,968
[45] Date of Patent: Apr. 28, 1998

[54] RATIOMETRIC CIRCUIT

[75] Inventors: Walter S. Czarnocki, Hoffman Estates; Thomas J. Walczak, Woodstock, both of Ill.

[73] Assignee: Motorola Inc., Schaumburg, Ill.

[21] Appl. No.: 641,453

[22] Filed: Apr. 30, 1996

[51] Int. Cl.⁶ .................................................. G01R 25/06
[52] U.S. Cl. ........................... 324/608; 324/662; 324/678
[58] Field of Search ........................ 73/514.18, 514.32; 324/662, 661, 676, 678, 608

[56] References Cited

U.S. PATENT DOCUMENTS

| | | |
|---|---|---|
| 5,205,171 | 4/1993 | O'Brien et al. |
| 5,465,604 | 11/1995 | Sherman .................... 73/514.18 |
| 5,473,946 | 12/1995 | Wyse ........................ 73/514.18 |
| 5,497,660 | 3/1996 | Warren ...................... 73/514.61 |
| 5,540,095 | 7/1996 | Sherman .................... 73/514.32 |

*Primary Examiner*—Ernest F. Karlsen
*Assistant Examiner*—Jose M. Solis
*Attorney, Agent, or Firm*—Michael L. Smith

[57] ABSTRACT

A ratiometric circuit (40) includes a differential capacitive sensor (42) for sensing a change in capacitance, a differential capacitive detector (46) operatively connected to the differential capacitive sensor for detecting a change in the capacitance of the differential capacitve sensor, an error voltage generator (48) operatively connected to the differential capacitve detector for generating a corrective voltage in response to the detected change in capacitance, and a bias circuit (50) operatively connected to the differential capacitive sensor for generating a bias voltage inversely proportional to and independent of a supply voltage for maintaining the ratiometricity between an output voltage of the differential capacitive sensor and the supply voltage.

14 Claims, 2 Drawing Sheets

— PRIOR ART —

RATIOMETRIC CIRCUIT

FIELD OF THE INVENTION

The present invention generally relates to the field of sensors and, in particular, to sensors whose output voltages must be ratiometric to a supply voltage.

BACKGROUND OF THE INVENTION

Many sensors, particularly single supply automotive sensors, need to have an output that is ratiometric to a supply voltage. In automotive systems the output from sensors is typically converted to a digital format using an analog-to-digital converter which needs a reference voltage for its operation. When sensor output is ratiometric the reference voltage can be simply derived from the supply voltage instead of using expensive precision references. In this kind of arrangement analog-to-digital conversion is independent of the supply voltage because the sensor output and the analog-to-digital converter reference track each other when the supply voltage changes. Therefore, conversion errors associated with the analog-to-digital converter reference voltage are eliminated. Thus, the system accuracy is improved and, in addition, the system cost is greatly reduced because there is no need for expensive precision reference.

A perfectly ratiometric output is one that changes by a corresponding percentage to any change in the circuit's supply voltage. By defining the output voltage as $V_o$ and the supply voltage as $V_{dd}$ then a perfectly ratiometric output is defined as:

$$\frac{\frac{dV_o}{V_o}}{\frac{dV_{dd}}{V_{dd}}} = 1 \qquad \text{EQUATION 1}$$

That is to say that the relative change of the output voltage is equal to the relative change of the supply voltage.

One type of circuit in the prior art that required a ratiometric output but was not ratiometric included a capacitive closed loop micromachined silicon accelerometer (MSA). Generally, the output voltage from such an MSA is not ratiometric and this is best illustrated by expressing the output voltage, $V_o$, derived from a force equilibrium equation:

$$V_o = \frac{1}{2} V_{sub} + \frac{ka}{V_{sub}} \qquad \text{EQUATION 2}$$

In this equation k is a constant, a is acceleration, and $V_{sub}$ is a voltage applied to the silicon substrate (moving electrode) of the MSA described in detail below. Normally $V_{sub}$ voltage should be as large as possible. However, even if the substrate voltage is equal to supply voltage $V_{sub}=V_{dd}$, the output voltage is not ratiometric primarily due to the $V_{sub}$ term in the denominator of equation 2.

An attempt to provide a ratiometric circuit using an MSA is shown in FIG. 1. In FIG. 1, a forced equilibrium of circuit 10 produces an output voltage that can be expressed as:

$$V_o = \frac{1}{2} V_{dd} + \left( \frac{ka}{4\left(V_{sub} - \frac{V_{dd}}{2}\right)} \right) \qquad \text{EQUATION 3}$$

In this circuit 10 $V_{sub}$ is kept constant, i.e. does not change with a supply voltage change. The circuit 10 can be ratiometric only for one particular value of the constant Vsub, namely, for Vsub equal to the supply voltage value Vdd, i.e. Vsub=Vdd. This poses a serious limitation on the usefulness of circuit 10, especially in case of a force rebalance accelerometer design. In particular, to sense acceleration over a range typically encountered in automotive applications a voltage greater than the typical 5 V available from an automotive single supply is needed. Also, to allow for substantial tolerance variations between MSA elements and tolerances of other components of circuit 10 more than a constant 5 V is needed at Vsub. Therefore, for an automotive accelerometer, a ratiometric circuit that is more versatile and not limited to one condition only is needed.

BRIEF DESCRIPTION OF THE DRAWINGS

For a more complete understanding of the invention reference should be made to the drawings, where.

DETAILED DESCRIPTION OF A PREFERRED EMBODIMENT

Figure 1:
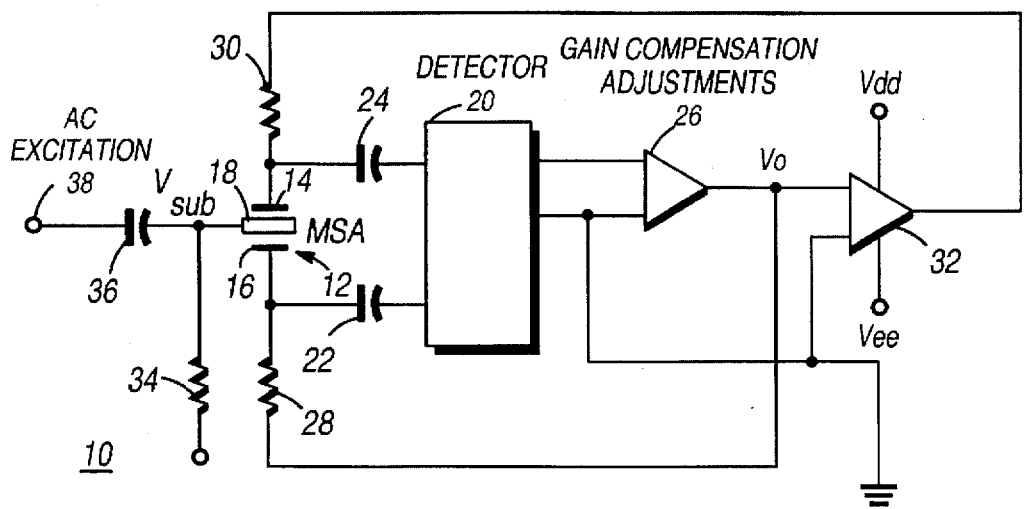
FIG. 1 is a prior art circuit.

In order to fully appreciate the advantages offered by the present invention a full understanding of the prior art attempt to provide a ratiometric circuit is in order. In FIG. 1, circuit 10 includes an MSA 12, preferably of the type disclosed in U.S. Pat. No. 5,205,171 to O'Brien et al. MSA 12 includes electrodes 14, 16, and 18. In use a capacitance is formed between electrodes 14 and 18, and 16 and 18. Acceleration of the automobile or other object containing the circuit 10 causes capacitance changes between the electrodes as common electrode 18 is forced towards or away from electrodes 14 and 16. This change in capacitance is used to develop an output voltage proportional to the acceleration experienced by circuit 10.

A detector 20 then detects a change in capacitance in the MSA 12 through AC coupling capacitors 22 and 24. Op amps 26 and 32 are then activated by detector 20 to provide the necessary DC voltages that are needed to force rebalance of MSA 12. Op amp 32 has a gain of −1 so that a DC voltage of an opposite polarity is applied to electrode 14 relative to electrode 16. Resistor 34 provides DC bias or voltage $V_{sub}$ to the common electrode 18. Capacitor 36 couples an AC excitation signal to the electrode 18. This signal is used to detect change in MSA 12 capacitance caused by the exposure to the acceleration. When exposed to an acceleration electrode 18 moves in a direction opposite of the acceleration causing the capacitances between electrodes 14 and 18, and 16 and 18 to become unbalanced. Capacitors 22 and 24 couple the AC excitation signal which contains information about the position of electrode 18 to the detector circuitry 20. The amplitude of the AC signal is then compared at electrodes 14 and 16 by detector 20 to determine the position of electrode 18. Detector 20 generates an appropriate DC force rebalance voltage. This rebalance voltage, supplied by opamps 26 and 32 respectively, is passed by resistors 28 and 30 to electrodes 16 and 14.

For this circuit a force equilibrium produces an output voltage that can be expressed as:

$$V_o = \frac{1}{2} V_{dd} + \left( \frac{ka}{4\left(V_{sub} - \frac{V_{dd}}{2}\right)} \right) \quad \text{EQUATION 4}$$

where voltage $V_{sub}$ is kept constant or is supply independent. From this equation the ratiometricity for circuit 10 can be expressed as follows:

EQUATION 5

$$\left( \frac{V_{dd}}{2\left(V_{sub} - \frac{V_{dd}}{2}\right)} \right) \left( \frac{4\left(V_{sub} - \frac{V_{dd}}{2}\right)^2 + ka}{2V_{dd}\left(V_{sub} - \frac{V_{dd}}{2}\right) + ka} \right) = \frac{\frac{dV_o}{V_o}}{\frac{dV_{dd}}{V_{dd}}}$$

This equation 5 shows that circuit 10 only can be ratiometric for one particular value of the constant $V_{sub}$ only, namely, for $V_{sub}$ equal to the supply voltage value, $V_{sub} = V_{dd}$. The substrate voltage has to be constant and supply independent. To sense acceleration over a range typically encountered in automotive applications a voltage greater than the typical 5 V available from an automotive single supply is needed. Moreover, more than 5 V is needed at $V_{sub}$ to allow for substantial make tolerance variations between MSA elements and other tolerances of circuit components.

Figure 2:
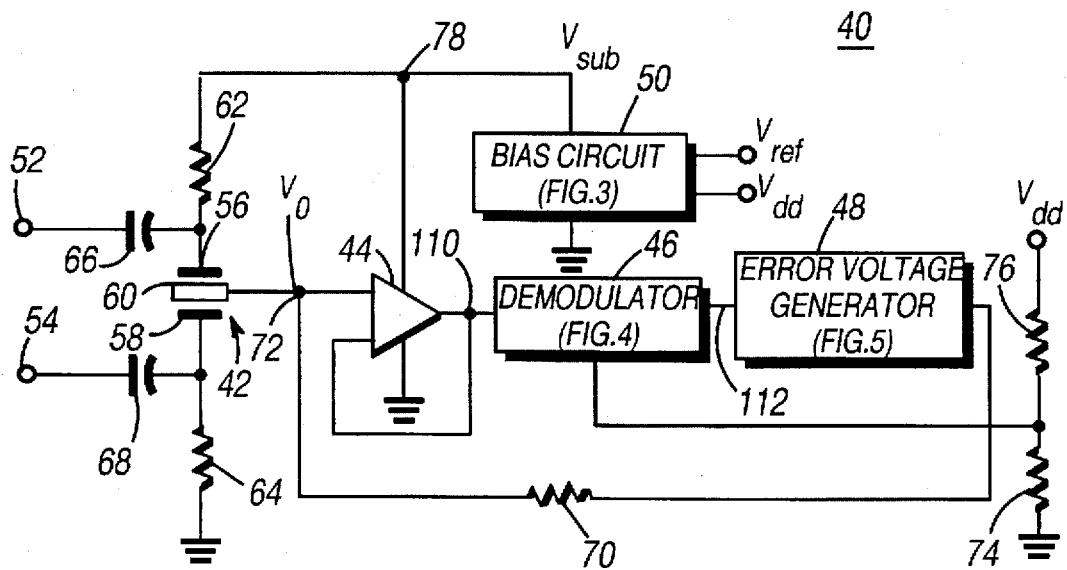
FIG. 2 is a ratiometric circuit in accordance with the present invention.

FIG. 2 shows a preferred embodiment of the present invention. Circuit 40 includes an MSA 42, which is identical to MSA 12 and can also be referred to as a differential capacitive sensor, an op amp 44, a synchronous demodulator 46, an error voltage generator 48, and a bias circuit 50. In operation MSA 42 is supplied with an excitation voltage from terminals 52 and 54 such that the voltage on terminal 52 is 180° out of phase from the voltage applied to terminal 54. This causes electrodes 56 and 58 of MSA 42 to hold terminal 60 in a neutral position when the automobile or other product containing circuit 40 is at rest. The voltage generator (not shown) supplying the voltage to terminals 52 and 54 combines with demodulator 46 to form a differential capacitive detector. Resistors 62 and 64 function to bias electrodes 50 and 56. Capacitors 66 and 68 couple the AC signals from inputs 52 and 54 to electrode 60. The AC excitation signals at electrodes 52 and 56 are 180 degrees out of phase from each other. Resistor 70 in the feedback loop from error voltage generator 48 couples the rebalance voltage produced by the error voltage generator 48 to node 72 and hence to MSA 42. Resistors 74 and 76 combine to form a voltage divider for supplying the proper voltage level to demodulator 46. The response time constant of the feedback loop is determined by a conventional pole-zero compensation network (not shown) connected between blocks 46 and 48.

The output voltage, $V_o$, of circuit 40 can be described as follows from the force equilibrium equation $$V_o = \frac{1}{2} V_{dd} + \left( \frac{ka}{2V_{sub}} \right) \quad \text{EQUATION 5}$$

A difference between circuit 40 and circuit 10 is that here a variable substrate voltage, $V_{sub}$ has been introduced rather than holding $V_{sub}$ constant with supply voltage $V_{dd}$ changes. The expression for variable $V_{sub}$ is shown below,

EQUATION 6

$$V_{sub} = \left(1 + \frac{R_a}{R_b}\right)\left(\left(1 + \frac{R}{R_1} + \frac{R}{R_2}\right)V_{ref} - \frac{R}{R_2} V_{dd}\right)$$

where $V_{ref}$ is a reference voltage that is constant or independent of the supply voltage, $V_{dd}$, changes. The ratios of resistors $R_a$, $R_b$, $R$, $R_1$, and $R_2$ of EQUATION 6 are set to assure that $V_{sub}$ changes in such a way that $V_o$ is ratiometric to $V_{dd}$. As can be seen with increasing the $V_{dd}$ voltage $V_{sub}$ has a negative slope and is offset which are both determined by the resistor ratios.

In a particular application, for instance in an automotive environment with an active suspension system, $V_{sub}$ of 8.25 V is needed in order to accurately measure a range of typically experienced accelerations. In this application the circuit 40 is supplied from an automotive single supply voltage of 5 V. With constant voltage $V_{ref} = 1$ V provided by the reference circuit and the supply voltage $V_{dd} = 5$ V, resistor ratios are set as follows: $1 + R_a/R_b = 8.25$, $R/R_2 = \frac{1}{5}$ and $R/R_1 = \frac{4}{5}$.

Therefore, EQUATION 6 becomes $$8.25\left(2 - \frac{V_{dd}}{5}\right) = V_{sub} \quad \text{EQUATION 7}$$

The ratiometricity of circuit 40 can be shown by $$\frac{\frac{dV_o}{V_o}}{\frac{dV_{dd}}{V_{dd}}} = \frac{V_{sub}^2 V_{dd} + \left(1 + \frac{R_a}{R_b}\right)\frac{R}{R_2} V_{dd}(ka)}{V_{sub}^2 V_{dd} + V_{sub}(ka)} \quad \text{EQUATION 8}$$

where $V_{dd} = 5$ V and $V_{sub} = 8.25$ V. Substituting the above described resistors ratios into EQUATION 8 produces $$\frac{\frac{dV_o}{V_o}}{\frac{dV_{dd}}{V_{dd}}} = 1 \quad \text{EQUATION 9}$$

In other words by having $V_{sub} = 8.25(2 - V_{dd}/5)$ the relative change of $V_o$ relative to the change of $V_{dd}$ will be 1, and therefore ratiometricity has been achieved. If a value other than 8.25 V for $V_{sub}$ is necessary, resistor ratios need to be changed accordingly but the circuit output voltage still will be ratiometric to the supply.

Figure 3:
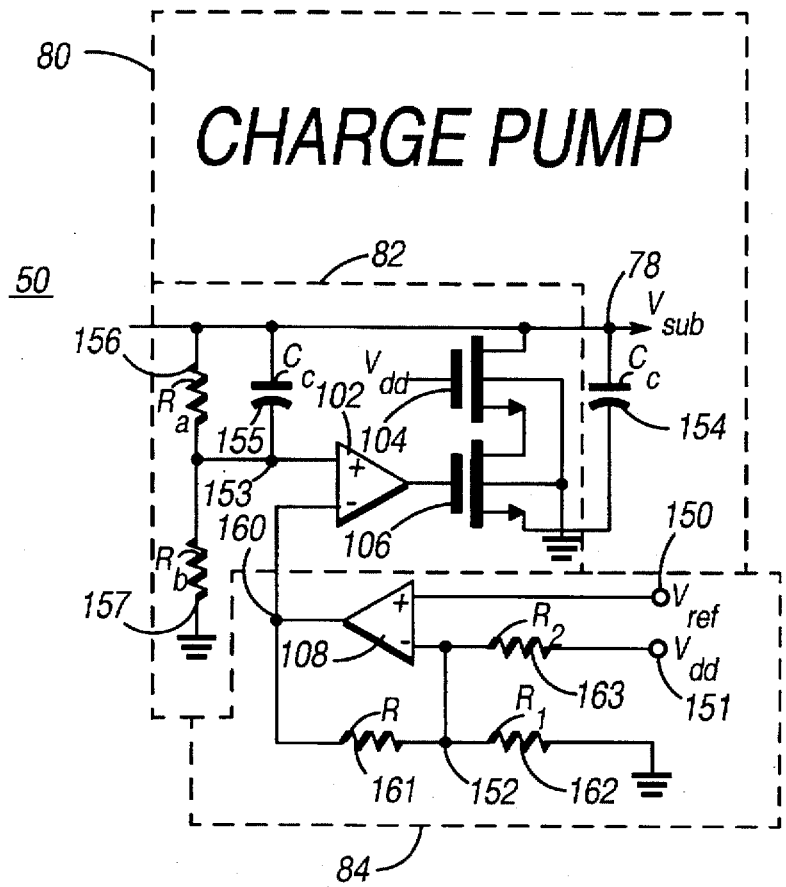
FIG. 3 is an example of a bias circuit portion of FIG. 2.

The bias circuit 50 of FIG. 3 includes three main sections—a charge pump 80, a regulator 82, and a control voltage generator 84. The charge pump 80 is conventional and well known to those skilled in the art and connected to circuit 40 of FIG. 2 at node 78. The bias circuit 50 is operatively connected to the MSA 42 for generating a bias voltage inversely proportional to and independent of a supply voltage for maintaining the ratiometricity between an output voltage of the MSA 42 and the supply voltage.

The charge pump 80 acts to substantially double its input voltage Vdd at node 151 and supply the doubled voltage to node 78. Regulator 82 is commonly referred to as a shunt regulator. It operates by sinking current from node 78 when the voltage on node 78 exceeds a predetermined threshold. When the voltage on node 78 is below the predetermined threshold regulator 82 does not sink current from node 78. In this manner the voltage on node 78 is held to a predetermined level which is substantially equal to the predetermined threshold. The voltage on node 160 serves as the reference voltage for comparator 102. Comparator 102 compares the reference voltage to the voltage on node 153. The voltage on node 153 is proportional to the voltage on node 78 and is derived by dividing the voltage on node 78 with resistors 156 and 157. The output 159 from comparator 102 controls the gate of transistor 106 in a manner such that when the voltage on node 78 is above a predetermined threshold transistor 106 sinks current lowering the voltage on node 78. Transistor 104 serves as a pass transistor and is commonly used to increase the drain breakdown voltage of transistor 106. Capacitors 155 and 154 compensate the shunt regulator control loop.

The control generator 84 produces a voltage on node 160 which is inversely proportional to the voltage on Vdd node 151. A reference voltage independent of Vdd is supplied to node 150 which is an input of comparator 108. The voltage on node 150 is compared to the voltage on node 152 by comparator 108 and an output is produced on node 160. Resistors 161, 162, and 163 form a divider network between the voltages on nodes 160 and 151.

Figure 4:
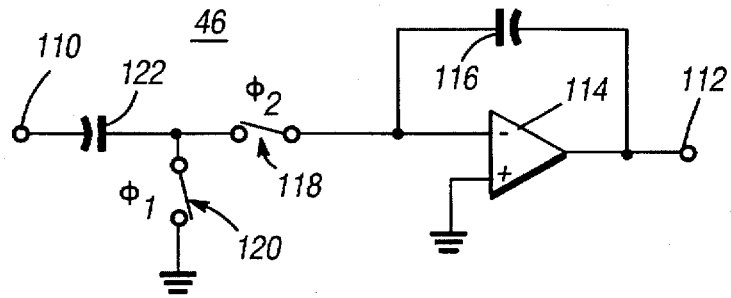
FIG. 4 is an example of a demodulator portion of FIG. 2.

FIG. 4 discloses a preferred embodiment of demodulator 46 of FIG. 2 connected between nodes 110 and 112. The demodulator 46 in FIG. 4 is preferably a switched capacitor demodulator and synchronously samples the input signal at node 110. During phase 1 when switch 120 is closed and switch 118 is open capacitor 122 is charged to the voltage present on node 110. During phase 2 when switch 120 is open and switch 118 is closed the charge present on capacitor 122 is transferred to capacitor 116. The voltage accumulated on capacitor 116 represents the position of proof mass 18 in MSA 12.

Figure 5:
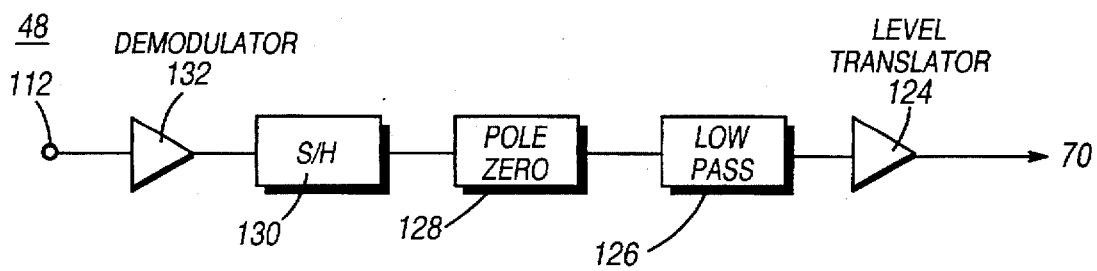
FIG. 5 is an example of an error voltage generator portion of FIG. 2.

FIG. 5 discloses a preferred embodiment of error voltage generator 48 of FIG. 2 connected between node 112 and resistor 70. The error voltage generator 48 consists of a sample and hold circuit 130 which samples the output of the demodulator preferably at a 5 KHz rate. The output of the sample and hold goes to the pole-zero compensation network 128 which preferably samples at 5 KHz and has a gain of 0.33. As those skilled in the art will appreciate, a pole-zero network is commonly used to compensate closed loop control systems by placing a pole and zero at the appropriate frequencies in the system. The output from the pole-zero network is connected to a lowpass filter 126 and is preferably sampled at 200 KHz and has a gain of 3. The lowpass filter 126 output is then connected to level translator 124. The level translator 124 converts a 1 Vp-p signal at the input to a 8.25 Vp-p signal at the output necessary to drive MSA 12. Essentially, the error voltage generator 48 is connected to the differential capacitive sensor (MSA 42) for generating a corrective voltage in response to the sensed change in capacitance.

Thus there has been shown and descirbed a specific embodiment of the invention, further modifications and improvements will occur to those skilled in the art. Such modifications could include other values for the various factors described for different acceleration ranges or the circuit described could be formed on a single chip. All modifications retaining the basic underlying principles disclosed and claimed are within the scope of this invention.

What is claimed is:

1. A ratiometric circuit comprising:
   a differential capacitive sensor for sensing a change in capacitance;
   a differential capacitive detector operatively connected to the differential capacitive sensor for detecting a change in the capacitance of the differential capacitve sensor;
   an error voltage generator operatively connected to the differential capacitve detector for generating a corrective voltage in response to the detected change in capacitance; and
   a bias circuit operatively connected to the differential capacitive sensor for generating a bias voltage inversely proportional to a supply voltage for maintaining a ratiometricity between an output voltage of the differential capacitive sensor and the supply voltage.

2. The ratiometric circuit of claim 1 wherein the differential capacitive sensor is a micromachined silicon accelerometer.

3. The ratiometric circuit of claim 1 wherein the differential capacitive sensor includes first, second, and common electrodes, the differential capacitive detector further including:
   a voltage generator for generating a first voltage and a second voltage shifted 180° in phase with respect to the first voltage and wherein the first and second voltages are applied to the first and second electrodes; and
   a synchronous demodulator having an input operably connected to the common electrode and an output connected to the error voltage generator.

4. The ratiometric circuit of claim 3 wherein the synchronous demodulator further includes a switched capacitor demodulator.

5. The ratiometric circuit of claim 1 wherein the error voltage generator further includes:
   a sample and hold circuit having an input connected to an output of the differential capacitive detector;
   a pole zero circuit having an input connected to an output of the sample and hold circuit;
   a low pass filter having an input connected to an output of the pole zero circuit; and
   a level translator having an input connected to an output of the low pass filter and an output connected to the differential capacitive sensor.

6. The ratiometric circuit of claim 1 wherein the bias circuit further includes:
   a charge pump having an input connected to the supply voltage and an output connected to the differential capacitive sensor for charging the differential capacitive sensor to a predetermined voltage level sufficient to maintain a ratiometricity of the differential capacitive sensor over a predetermined range of capacitive charge;
   a shunt regulator connected to the output of the charge pump for ensuring a constant voltage level is supplied to the differential capacitive sensor by the charge pump; and
   a control voltage generator having an input connected to the supply voltage and another input connected to a constant reference voltage and an output connected to the shunt regulator for generating a control voltage to the shunt regulator.

7. The ratiometric circuit of claim 6 wherein the control voltage generator further includes:
   an operational amplifier having an output connected to the input of the shunt regulator; and
   a resistor network having a first terminal connected to the supply voltage and a second terminal connected to an input of the operational amplifier and a third terminal connected to the output of the operational amplifier for generating a control voltage to the shunt regulator that is inversely proportional to the supply voltage.

8. The ratiometric circuit of claim 1 implemented on a single integrated circuit chip.

9. A ratiometric circuit comprising:
   a differential capacitive sensor presenting first, second, and common electrodes wherein a first capacitance exists between the first and common electrodes and a second capacitance exists between the second and common electrodes the sensor thereby sensing a change in capacitance between the first capacitance and the second capacitance;
   a voltage generator for generating a first voltage and a second voltage shifted 180° in phase with respect to the first voltage and wherein the first and second voltages are applied to the first and second electrodes;

a synchronous demodulator having an input connected to the common electrode for quantifying the sensed change between the first capacitance and the second capacitance;

an error voltage generator operatively connected to the synchronous demodulator for generating a corrective voltage in response to the quantified change in capacitance;

a charge pump having an input connected to a supply voltage and an output connected to the differential capacitive sensor for charging the differential capacitive sensor to a voltage level sufficient to maintain a ratiometricity of the differential capacitive sensor over a predetermined range of capacitive charge;

a shunt regulator connected to the output of the charge pump for ensuring a constant voltage level is supplied to the differential capacitive sensor by the charge pump; and a control voltage generator having a first input connected to the supply voltage and a second input connected to a constant reference voltage and an output connected to the shunt regulator for generating a control voltage to the shunt regulator.

10. The ratiometric circuit of claim 9 wherein the differential capacitive sensor is a micromachined silicon accelerometer.

11. The ratiometric circuit of claim 9 wherein the synchronous demodulator further includes a switched capacitor demodulator.

12. The ratiometric circuit of claim 9 wherein the error voltage generator further includes:

a sample and hold circuit having an input connected to the output of the synchronous demodulator;

a pole zero circuit having an input connected to an output of the sample and hold circuit;

a low pass filter having an input connected to an output of the pole zero circuit; and a level translator having an input connected to an output of the low pass filter and an output connected to the differential capacitive sensor.

13. The ratiometric circuit of claim 9 wherein the control voltage generator further includes:

an operational amplifier having an output connected to the input of the shunt regulator; and a resistor network having a first terminal connected to the supply voltage and a second terminal connected to an input of the operational amplifier and a third terminal connected to the output of the operational amplifier for generating a control voltage to the shunt regulator that is inversely proportional to the supply voltage.

14. A ratiometric circuit comprising:

sensing means for sensing a change in capacitance between a first and a second capacitance;

quantifying means operably coupled to the sensing means for quantifying the change in capacitance;

correction means operably coupled to the quantifying means for generating a corrective voltage in response to the quantified change in capacitance; and bias means operatively connected to the sensing means for generating a bias voltage inversely proportional to a supply voltage for maintaining the ratiometricity between an output voltage of the sensing means and the supply voltage.

* * * * *